(12) United States Patent
Wood et al.

(10) Patent No.: US 6,363,778 B1
(45) Date of Patent: Apr. 2, 2002

(54) ENGINE MISFIRE MONITOR

(75) Inventors: R. Andrew Wood, Bloomington; Ulrich Bonne, Hopkins; Daniel P Johnson, Fridley, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/213,502

(22) Filed: Dec. 17, 1998

(51) Int. Cl.[7] ............................................. G01M 19/00
(52) U.S. Cl. .................................................... 73/118.1
(58) Field of Search ............................... 73/116, 117.3, 73/35, 118.1

(56) References Cited

U.S. PATENT DOCUMENTS

| | | | |
|---|---|---|---|
| 3,752,131 A | 8/1973 | Tusmura et al. | |
| 3,924,457 A | * 12/1975 | Oshima et al. | 73/116 |
| 3,939,711 A | 2/1976 | Hanaoka | |
| 3,983,754 A | 10/1976 | Deguchi et al. | |
| 3,999,383 A | 12/1976 | Hanaoka | |
| 4,040,294 A | 8/1977 | Matsuda et al. | |
| 4,128,998 A | 12/1978 | Hattori et al. | |
| 4,602,507 A | * 7/1986 | Hayes | 73/117.3 |
| 4,887,574 A | * 12/1989 | Kuroiwa et al. | 73/116 |
| 4,971,010 A | 11/1990 | Iwata | |
| 5,052,214 A | * 10/1991 | Dils | 73/35 |

* cited by examiner

Primary Examiner—Benjamin R. Fuller
Assistant Examiner—Maurice Stevens
(74) Attorney, Agent, or Firm—John G. Shudy, Jr.

(57) ABSTRACT

A misfire monitor for detecting cylinder misfires in an internal combustion engine. The monitor has a light detector that senses infrared light signals emerging from combustion gases through a window inserted on an exhaust pipe or manifold. Characteristics of a detected light signal indicate whether there is a firing or a misfire in any cylinder. Other information about the engine is deduced with processing of the detected signals and misfire counts. The detection is real time and functions well at all normal engine speeds and operating conditions.

49 Claims, 4 Drawing Sheets

ENGINE MISFIRE MONITOR

BACKGROUND

The present invention pertains to internal combustion engine health monitoring, and particularly to engine diagnostics. More particularly, the invention pertains to detection of engine ignition misfiring.

Engine misfiring reduces the power output of the engine, and causes poor performance, engine roughness, low fuel economy, deterioration of the catalytic converter, and increased pollution. Catalytic converters will have reduced life expectancy and efficiency because of unburned fuel passing to and combusting in the hot converter. Lack of converter efficiency results in more emissions. Incomplete burning of fossil fuels is a prime source of air pollution. An engine that misfires only two percent of the time, for example, may produce pollutant levels that exceed emission standards by 150 percent.

Present and proposed regulations in certain states require that vehicles have onboard devices for detecting and warning of engine misfire. Such devices must be capable of identifying which particular cylinder is misfiring, or in the case of multiple cylinder misfires, indicating that more than one cylinder is misfiring. A preference is for a system that can additionally determine which cylinders are misfiring in the case of multiple misfires, identify sporadic non-periodic misfiring events, and detect isolated misfires. Further, a system should be able to detect five or fewer misfires for every 1,000 firings, count the misfires and firings, and function at all normal engine speeds and any operating conditions.

Related-art engine misfire detection systems for misfire detection have used various approaches. Some examples are the detection of rotations-per-minute (RPM) fluctuations of engine output, absence of a spark or proper sparkplug current in the ignition system, exhaust pipe temperature changes, relative temperature differences among the exhaust ports, rotational torque variation, exhaust pressure pulsing and abnormal content of exhaust gases. None of these systems provide highly accurate and real-time determination of information required for the above-noted preferred misfire detection data. Piezo or pressure sensor-based systems suffer from structural noise, and thermocouple-based systems have short lifetimes. The present device has little or no structural noise and has a long lifetime. This device also can provide data accurately, reliably and at low cost.

SUMMARY OF THE INVENTION

The present invention is a misfire detector that senses firings and misfires of an internal combustion engine. The exhaust pipe coupled to the exhaust manifold has a window fabricated on a side so that an infrared (IR) light sensor proximate to the window can detect IR light emerging from the hot exhaust gases passing through the pipe. The window instead may be placed in the exhaust manifold or in a short separate piece of exhaust pipe, which may be inserted in-line as a part of the engine's exhaust pipe. The window should be situated so that the exhaust gases are detected before they reach the catalytic converter. The temperature and position of the window is such as not to become opaque by solid deposits.

The window is made from a material that transmits IR light and is resistant to heat. Also, a narrow-band filter (e.g., an interference filter) may be placed proximate to the window or sensor. The filter may be an integral part of the window, if the filter is thermally robust and insensitive to temperature. The window is placed on or within a hole in or a cut out area of the exhaust pipe and is sealed about its border to prevent exhaust gases from escaping from around the window.

The sensor is placed proximate to the window sufficient to detect the IR light (i.e., thermal emission) from the gases. Exhaust gases may contain compounds such as $CO_2$, $H_2O$, $CO$, $N_2$, $O_2$, $HC$, $NO$, $NO_2$ and so on. The IR light amounts to pulse-like signals corresponding to the ignited air-fuel mixtures emanating from the cylinders. Examples of a fuel are gasoline, ethanol, kerosene, mixtures of various fuels, and so forth. If there is a misfire, then there will be a corresponding change in the pulse-like IR signal since the unburned gases will be different in temperature, composition or pressure from the bursts of burned gases emanating from the cylinders. The exhaust gas both emits and absorbs light in a manner dependent on composition, temperature, pressure and wavelength; and the net amplitude of the light wavelengths emerging from the gas is thus indicative of the nature of the exhaust gas.

The sensor converts the sensed IR light signal into electrical signals representing the IR signals, which in turn indicate the nature of the exhaust gas, which in turn indicates the proper operation of a cylinder. The electrical signals are fed into an onboard processor, which may be the engine processor. These signals are correlated or synchronized with ignition signals going to the spark plugs of a four-cycle or two-cycle engine. This correlation or synchronization with the ignition signals can be compensated for variation of the timing of the spark (such as the advance of the spark at higher engine RPM) relative to the cycle or stroke of the piston in the cylinder.

In the case of an engine not having an ignition system, such as some diesel engines, sensor output signals may be correlated or synchronized with a crankshaft position locator. The position locator may be a magnetic sensor situated on the crankshaft torsion-damper pulley or the like, which is on the end of the crankshaft. The pulley may have a piece of steel or iron adhered to its outer circumference that is sensed by the magnetic sensor.

Alternatively, a camshaft position indicator may be used to note the position of the crankshaft for a cam that has a fixed positional relationship relative to the crankshaft during operation of the engine. For cases wherein the camshaft position is varied relative to the crankshaft during operation of the engine, the processor may compensate for that effect. Also, there is a variable delay between the igniting of the gases and their passing by the window to be detected, which can be compensated for by the processor if it is desired to know which cylinder the detected hot gas pulse or cold gas comes from.

The processor may count in real-time the misfires and the firings over any set period of time. The processor can provide the number of misfires for each cylinder. Further, the processor may calculate the percentage of misfires relative to the total number of times that the engine should have firings during a given period of time, for certain cylinders or for all of the cylinders. If there is only one misfire, the processor can identify the specific cylinder having the misfire since the misfire is in the sequence of the total of the firings for the respective cylinders of the engine over a set period of time. The processor's counter and memory can count and record all the firings or misfires of the engine. This information is available from the processor at any engine speed and under all operating conditions (e.g., cold operation, acceleration, hot operation, high-output power, low and high RPM, and normal operation).

DESCRIPTION OF THE EMBODIMENTS

Figure 1:
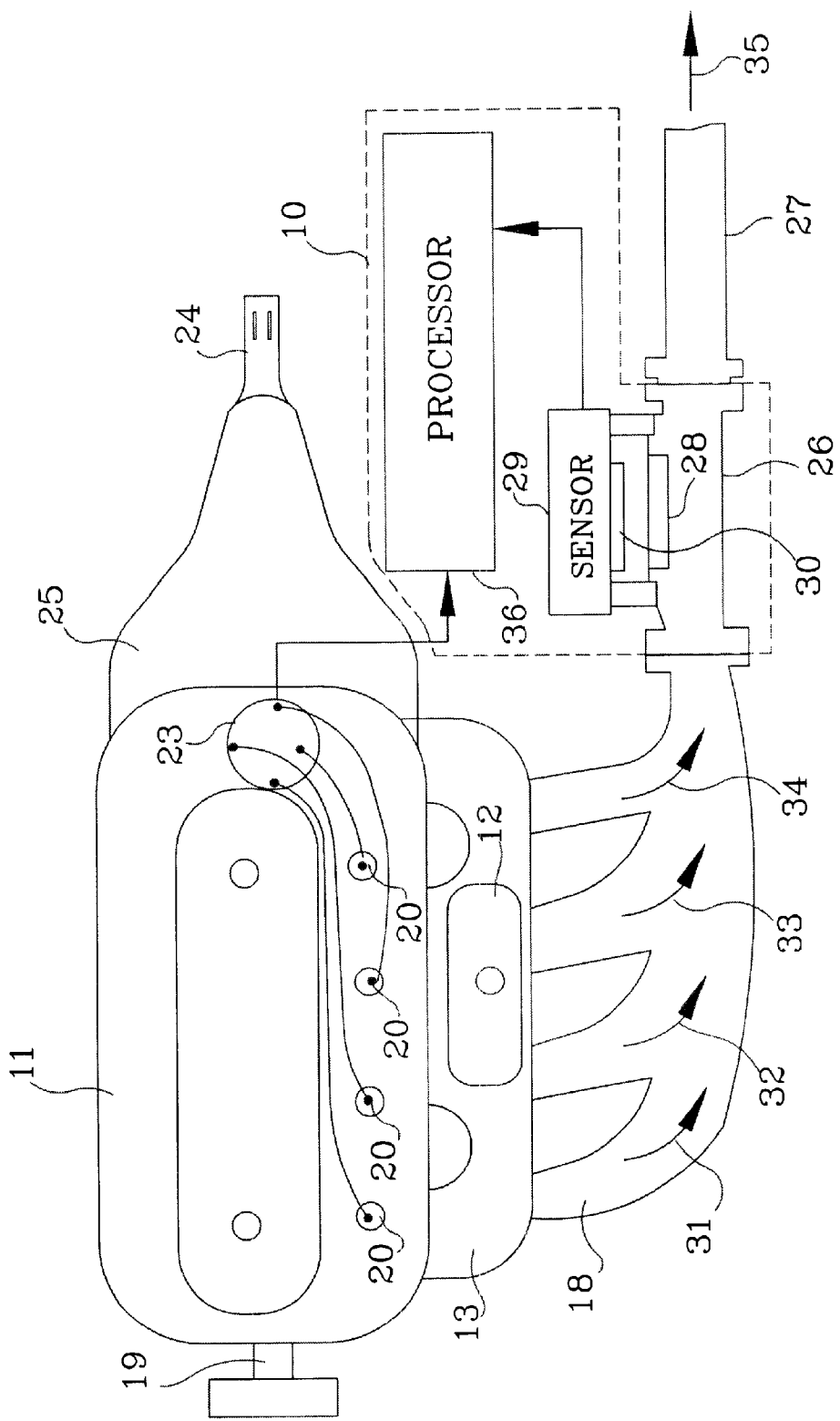
FIG. 1 is an overall diagram of the engine sensor arrangement and processor.

FIG. 1 shows a diagram of an engine misfire monitor 10 and its interrelationship with an engine 11. When operating, engine 11 has four cylinders 14 that individually have a piston 15 connected to a crankshaft, and at least one intake valve 16 and one exhaust valve 17. Each piston has four cycles or strokes.

Figure 2A:
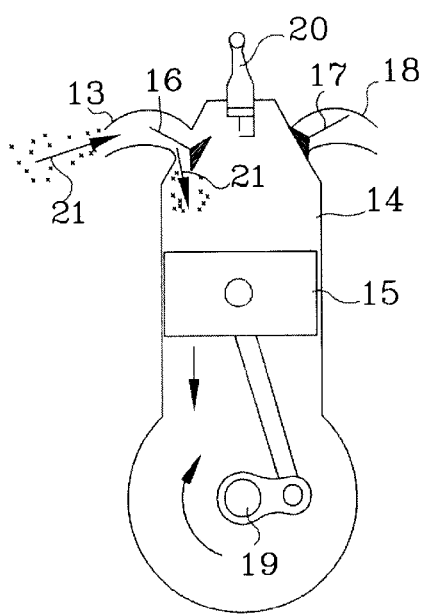
FIGS. 2a, 2b, 2c and 2d illustrate the stages of a four-cycle internal combustion engine.

The first is the intake cycle or stroke, in FIG. 2a, when piston 15 moves (typically downward) partially out of the cylinder 14, and through an open intake valve 16, sucks in an air and gasoline mixture 21 via a carburetor 12 and intake manifold 13. Crankshaft 19 turns clockwise. The air and gasoline mixture may be instead be provided by a fuel injection system or other fuel and air delivery system.

Figure 2B:
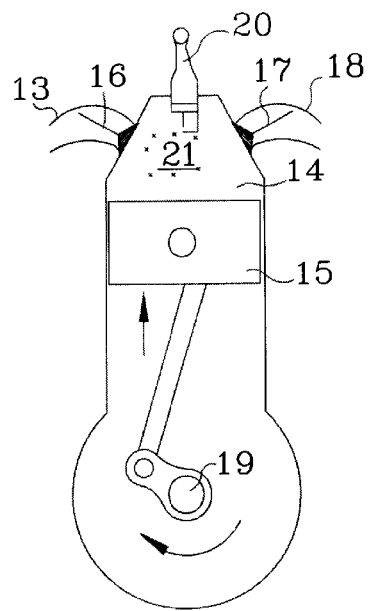
Figure 2C:
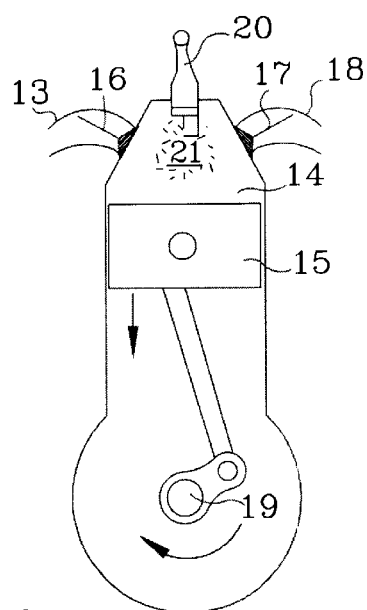
Figure 2D:
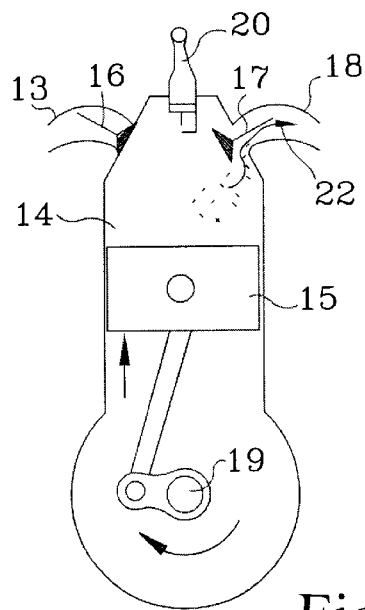

When piston 15 is down a complete stroke, valves 16 and 17 are closed, and piston 15 moves up to compress mixture 21 in cylinder 14, as shown in FIG. 2b. As piston 15 moves towards the top of cylinder 14, valves 16 and 17 are still closed and mixture 21 is compressed. Sparkplug 20 then emits a timed electrical spark thereby igniting compressed mixture 21 into an explosion that forces piston 15 down cylinder 14 and providing power to crankshaft 19 to keep it rotating, as shown in FIG. 2c. The electrical current for sparkplug 20 comes from ignition module or distributor 23. Piston 15 again moves up cylinder 14 pushing burned exhaust gases out of cylinder 14 by open exhaust valve 17 into exhaust manifold 18, as shown in FIG. 2d.

These intake, compression, power and exhaust strokes are repeated as long as engine 11 continues to run. Valves 16 and 17 are mechanically linked to and actuated by a camshaft. The camshaft is coupled to crankshaft 19 by a chain or belt. The camshaft rotates at one-half the RPM of crankshaft 19. The timing of ignition 23 is synchronized to the camshaft or the crankshaft. However, the timing may be varied for optimum performance of engine 11 at various speeds.

Engine 11 has four cylinders that sequentially have a power stroke at each half-revolution of crankshaft 19 for continuous power; that is, there is only one power stoke in engine 11 at a time. The power goes from crankshaft 19 to driveshaft 24, via transmission 25, and on to the rear or front wheels of an automobile.

Engines may have different numbers of cylinders. For instance, one, two, three, four, five, six, eight, ten, twelve and sixteen cylinder engines have been produced. Present ignition misfire monitor 11 may be modified to provide information from four-stroke engines have various numbers of cylinders and from two-stroke engines.

Figure 3:
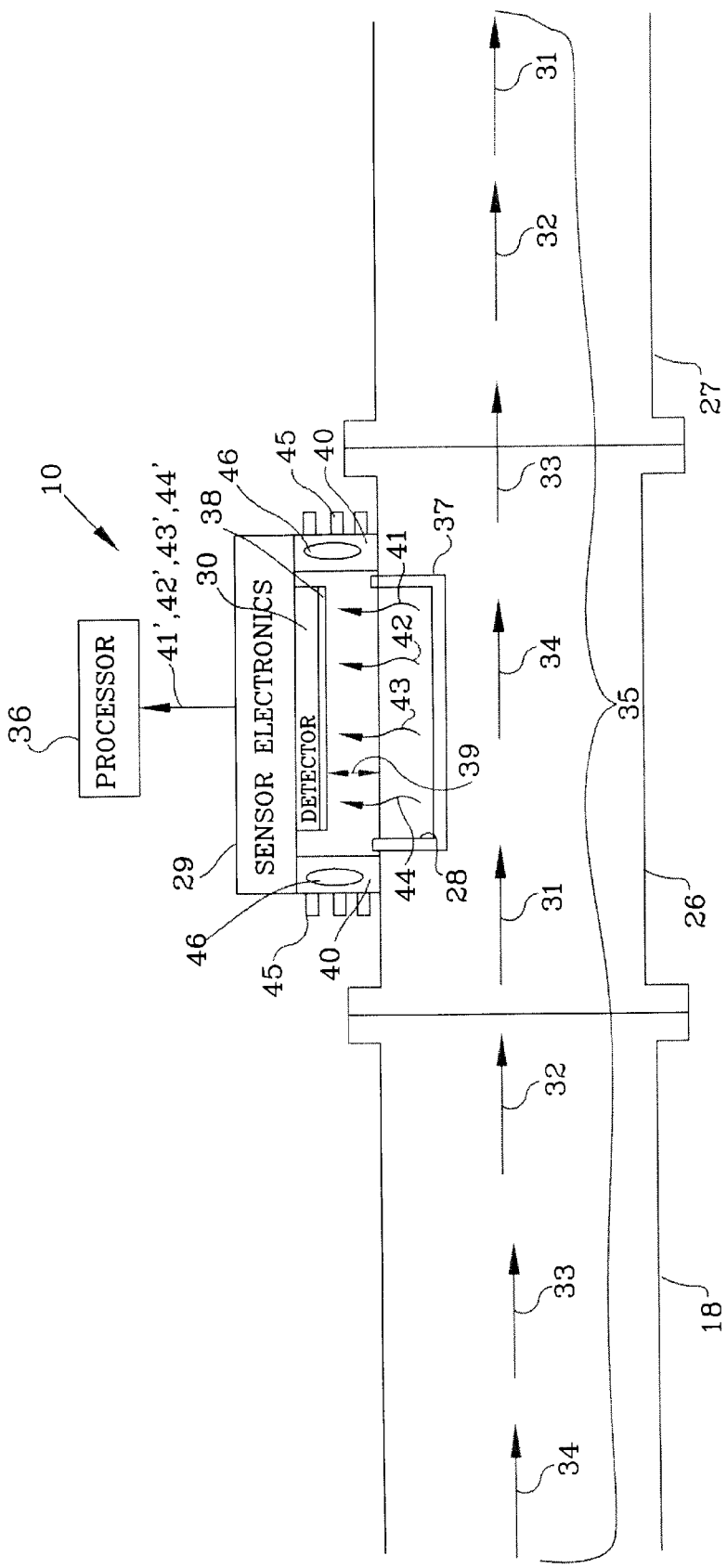
FIG. 3 is a detailed diagram of the misfire monitor.

Exhaust gases 22 of FIGS. 2a, 2b, 2c and 2d, are referred to in FIG. 3 as exhaust gases 31, 32, 33 and 34, which come from first, second, third and fourth cylinders 14, respectively. These exhaust gases, referred to collectively as exhaust gas 35, go from exhaust manifold 18 to exhaust pipe section 26 and on to pipe 27, which is likely connected to a catalytic converter and a muffler, in that order.

Exhaust section 26 has a window 28, which is transmissive to IR light 41, 42, 43 and 44 emanated by the exhaust gases 31, 32, 33 and 34, respectively. IR detector element 30 detects this IR light and converts it into electrical signals 41', 42', 43' and 44', which are representative of IR light signals 41, 42, 43 and 44, which in turn are representative of exhaust gases 31, 32, 33 and 34. The electrical signals go to processor 36.

Window 28 is fabricated on an opening of exhaust piece 26. The mounting of window 28 is sealed with a border material 37 to prevent exhaust gas 35 from leaking out of pipe 26. Window 28 may be made from sapphire, quartz or other material that is transmissive to IR light, heat resistant, and impervious to vibration on an exhaust pipe or manifold of an engine. Glass may be used but it absorbs a significant portion of some useful IR light wavelengths passing through the glass. Silicon may be used, but it is more fragile. Sapphire is desirable because it is hard, very IR-light transmissive, high-temperature tolerant and physically durable, and relatively inexpensive. The window may have the shape of a lens for better directing the light to be projected on to detector element 30.

IR detector 30 may be a silicon thermoelectric sensor or a bolometer. Detector 30 may be an array of detectors. Detector 30 itself may be inherently an uncooled detector. Detector 30 typically would not incorporate cryogenic cooling. IR detectors requiring cryogenic operating temperatures are too expensive. Other kinds of IR detectors or optical sensors, (e.g., silicon photodiodes, indium antinoxide, lead selenite and pyroelectric sensors) may be used if they are insensitive to high temperatures. However, such sensors are more costly. They are still sensitive to high temperatures near the engine, or less impervious to engine exhaust pipe vibration, or not sufficiently fast. Detector 30 needs to have a reasonable signal-to-noise ratio and a sufficiently fast response time, preferably about one millisecond or less For an improved rejection of IR radiation from the hot exhaust components, a narrow band IR filter 38 may be situated between the exhaust gas and detector 30. Filter 38 is designed for being transmissive for one or more of the wavelengths emitted by exhaust gas components, e.g., a wavelength between one micron and five microns, such as 1.9, 2.7, 4.3 or 4.6 microns. A 4.3-micron filter may be preferable as this wavelength corresponds to that of a strong $CO_2$ emission and absorption. Filter 38 may be an integral part of window 28. On the other hand, filter 38 may be proximate to detector 30. Multiple IR sensors with IR filters tuned to different IR emission lines may be also employed, but one is generally sufficient and lower in cost.

Detector 30 is about one to two centimeters in distance 39 from window 28, so as to allow adequate collection of IR light whilst aiding thermal insulation from the hot exhaust pipe. This distance may be more or less depending on materials and structural design of monitor 10 and any required monitor cooling arrangement. The exact dimensions depend on the strength of the IR signals, the nature of detector 30, electronics 29 and processor 36, and the temperature tolerance of monitor 10. Detector 30 is kept at a suitable distance 39 by a support structure 40. Support structure 40 may consist of an insulating material having high temperature durability. Structure 40 may instead be fabricated from a metal and have fins 45 for air-cooling. Cooling air may move through the space between detector 30 and window 28. Alternatively, structure 40 may surround and encompass the space between window 28 and detector 30. This configuration would include a cavity or fluid jacket 46 so that water or other cooling liquid can circulated through jacket 46 to cool the space between window 28 and detector 30. Cooling minimizes the background thermal emission from the exhaust pipe and window areas viewed by detector 30. Minimizing or reducing background thermal emission increases the signal-to-noise ratios of light signals 41, 42, 43 and 44 and electrical signals 41', 42', 43' and 44'.

Figure 4:
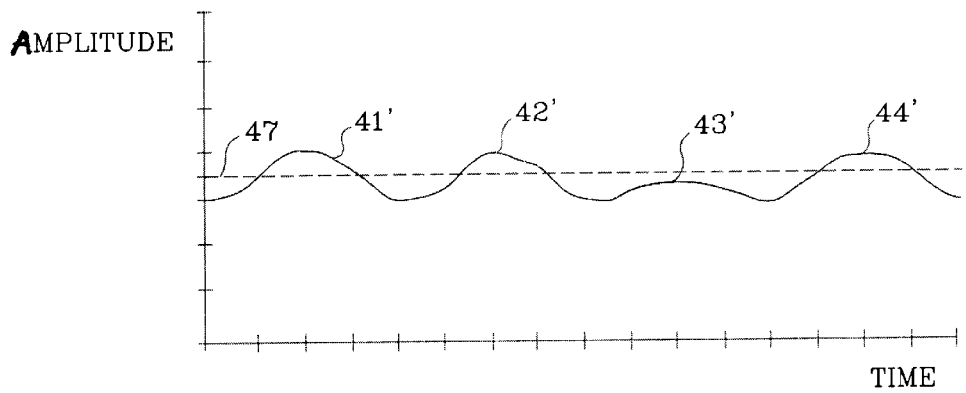
FIG. 4 is a graph showing the electrical signals representing the light signals detected from the exhaust gas.

As noted above, electrical signals 41', 42', 43' and 44' ultimately represent exhaust gases 31, 32, 33 and 34. FIG. 4 is a graph showing the amplitude of signals 41', 42', 43' and 44' versus time. The time scale in terms of milliseconds is variable depending upon the speed of the engine. In the case of crankshaft 19 rotation at 500 RPM each mark represents about 15 milliseconds and at 5,000 RPM each mark represents 1.5 milliseconds. Waveforms 41', 42', 43' and 44' represent the exhaust gases from the first, second, third and fourth cylinders 14, respectively. Amplitude may be in terms of voltage. Line 47 is the threshold voltage for determining whether there is a misfire. Line 47 may be a fixed value, or defined in terms of a relative deviation of a waveform from the average waveform amplitude. If the amplitude of any waveform is greater than threshold voltage 47, then there is a firing. If the waveform is less than threshold voltage 47, then there is a misfire. More than one amplitude line may clearly be defined and employed, in the same manner, to further characterize the nature and severity of misfires through the waveform amplitude. A timing signal from device 51 for synchronizing and identifying waveforms with respect to cylinders 14, is obtained from ignition system 23 of engine 11. Synchronizing is also adjusted for delays due to travel of the exhaust gases through the exhaust system to the detector or detectors 30. Further, compensation may be effected for other factors such as exhaust, throttle position, temperature and backpressure.

Figure 5:
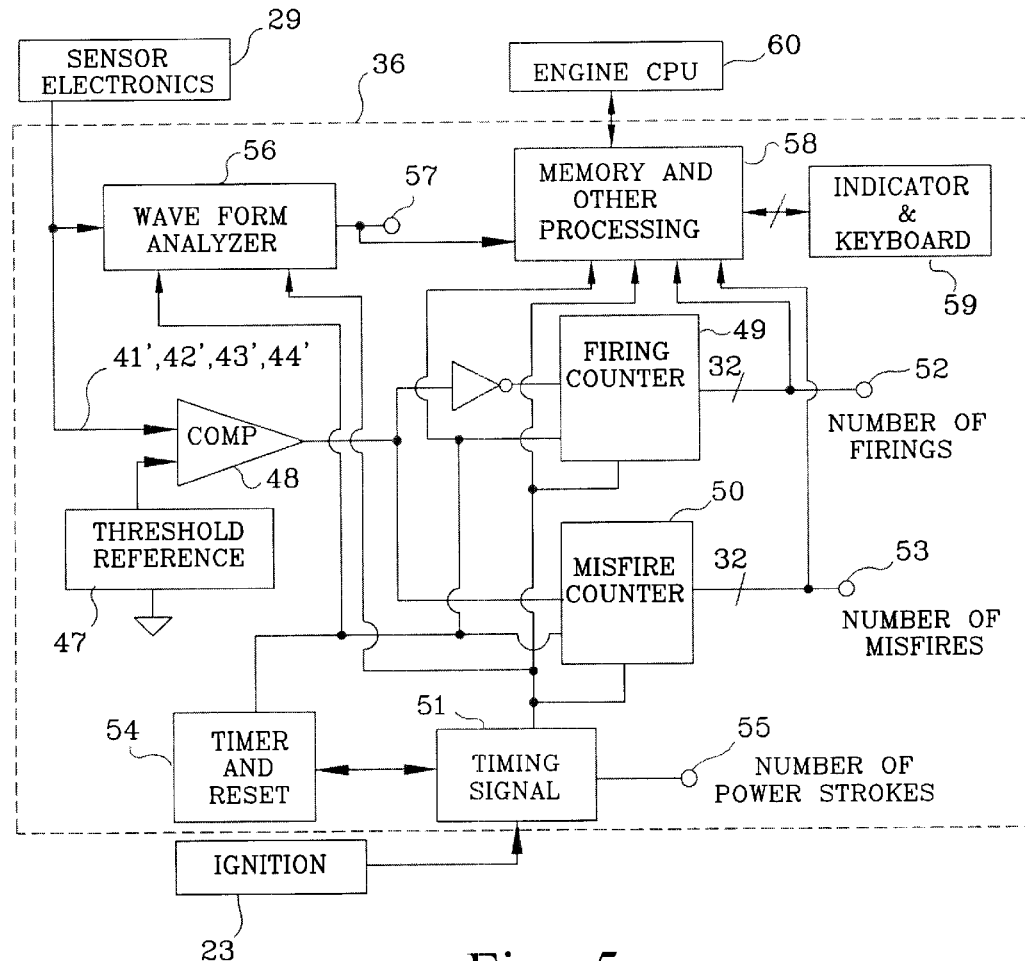
FIG. 5 is a diagram of the processor associated with the misfire monitor.

FIG. 5 is a schematic shown a portion of processor 36. Electrical signals 41', 42', 43' and 44' go from the output of sensor electronics 29 to a comparator 48 which classifies the signal into misfires or firing according to the threshold reference 47. The output of comparator 48 goes to counters 49 and 50. Timing signal 51 is a clock signal to counters 49 and 50. Output 52 provides the total number of firings and output 53 provides the total number of misfires for a given period of time, which is set and given by timer and reset device 54. Output 55 of timing signal device 51 provides the total number of power strokes.

Output 41', 42', 43' and 44' from sensor electronics 29 also goes to waveform analyzer 56 to process the waveforms to provide an output 57 with other data and information about engine 11 performance, such as the stoichiometry of the air-to-fuel mixture 21 and exhaust gases 35, and combustion efficiency. Other inferred and direct information about engine 11 and its combustion processes is available from analyzer 56.

Timing and reset information from timing and clock device 51, firing and misfire information from counters 49 and 50, and other engine information are input to a memory and other processing device 58. Memory and processing unit 58 provides information and receives directions for retrieving and storing certain information and executing particular actions from an operator interface indicator and keyboard 59. Processor 36 interfaces with an engine 11 central processing unit (CPU) 60, via memory and other processing device 58.

Processor 36, associated electronics, sensor electronics 29, detector 30 and window 28 may have a variety of enhanced systems (e.g., a detector and window for each cylinder) or abbreviated arrangements not presently described in great detail. Not describing every possible embodiment or permutation does not detract from or minimize the invention and its merit or spirit as disclosed here.

What is claimed is:

1. A misfire monitor for an engine having at least one engine cylinder, comprising:

a window situated on an exhaust pipe of the engine downstream of the at least one engine cylinder, the exhaust pipe carrying heated exhaust from the engine, the heated exhaust emits light;

a light detector proximate to said window, said light detector detecting light that is emitted through the window by the heated exhaust in the exhaust pipe, the light detector providing an output signal; and a processor connected to said light detector, said processor identifying a misfire of the engine using, at least on part, the output signal of the light detector.

2. A misfire monitor for an engine having at least one engine cylinder, comprising:

a window situated on an exhaust pipe of the engine downstream of the at least one engine cylinder; an exhaust gas from the at least one cylinder of the engine, which passes through the exhaust pipe, emits light;

a light detector proximate to said window, a portion of the light passes through said window and impinges said light detector, said light detector outputs an electrical signal representative of the light;

a processor connected to said light detector, said processor identifying a misfire of the engine using, at least on part, the output signal of the light detector.

3. The misfire monitor of claim 2, further comprising a support structure for holding said detector proximate to said window.

4. The misfire monitor of claim 3, wherein:

said processor receives and measures an amplitude of the electrical signal from said detector;

if the amplitude is within a certain range of values, then the electrical signal is counted as a firing by the processor; and if the amplitude is not within the certain range of values, then the electrical signal is counted as a misfire by the processor.

5. The misfire monitor of claim 4, wherein the certain range of values is determined in terms of a deviation from an average amplitude value of a plurality of amplitudes of a plurality of electrical signals from said detector.

6. The misfire monitor of claim 5, wherein:

said detector is at a sufficient distance from said window to keep the detector from becoming unreasonably hot; and said detector is close enough to detect a signal from a burned exhaust gas adequate for providing an electrical signal that indicates a firing.

7. The misfire monitor of claim 6, wherein:

an electrical signal counted by said processor as a firing, is recorded by said processor;

an electrical signal counted by said processor as a misfire, is recorded by said processor; and said processor can calculate for a given period of time a number of misfires and a number of firings.

8. The misfire monitor of claim 7, wherein:

said processor can receive an electrical signal from the engine for identifying a cylinder as a source of an exhaust gas; and said processor can identify a cylinder from which each misfire and firing comes.

9. The misfire monitor of claim 8, wherein said processor determines stoichiometric properties of an air-fuel mixture that resulted in the exhaust gas detected, according to characteristics of said electrical signal representative of the light emitted by the exhaust gas.

10. The misfire monitor of claim 9, further comprising:
a filter situated between the exhaust gas and said detector; and
wherein said filter has at least one transmissive wavelength.

11. The misfire monitor of claim 10, wherein the light is infrared light.

12. The misfire monitor of claim 11, wherein the at least one transmissive wavelength is the same as at least one source wavelength emerging from the exhaust gas.

13. The misfire monitor of claim 12, wherein the at least one source wavelength is between one and five microns.

14. The misfire monitor of claim 13, wherein said window is fabricated from a heat-tolerant, infrared-transparent material.

15. The misfire monitor of claim 14, wherein said window is fabricated from sapphire.

16. The misfire monitor of claim 14, wherein said window is fabricated from quartz.

17. The misfire monitor of claim 14, wherein said window is fabricated from silicon.

18. The misfire monitor of claim 14, wherein said window is fabricated from glass.

19. The misfire monitor of claim 10, wherein said detector is an infrared light detector.

20. The misfire monitor of claim 19, wherein said detector is an uncooled, infrared light detector.

21. The misfire monitor of claim 19, wherein said detector is a thermoelectric sensor.

22. The misfire monitor of claim 19, wherein said detector is a bolometer.

23. The misfire monitor of claim 19, wherein said detector is a pyroelectric sensor.

24. The misfire monitor of claim 19, wherein said detector is a photoconductive sensor.

25. The misfire monitor of claim 19, wherein said detector is a photovoltaic sensor.

26. The misfire monitor of claim 10, wherein said detector is an array of detectors.

27. The misfire monitor of claim 4, wherein said support structure is a heat minimizing structure.

28. The misfire monitor of claim 27, wherein said support structure comprises a heat insulating material.

29. The misfire monitor of claim 27, wherein said support structure comprises means for cooling a background area of said window.

30. The misfire monitor of claim 29, wherein the means for cooling comprises heat radiative fins.

31. The misfire monitor of claim 29, wherein the means for cooling comprises a cooling liquid jacket.

32. The misfire monitor of claim 27, wherein said support structure comprises means for cooling said detector.

33. The misfire monitor of claim 14, wherein said window has a shape of a lens for directing the light from the exhaust gas.

34. A method for monitoring misfires of an engine having at least one engine cylinder, comprising the steps of:
detecting and converting light signals emerging from exhaust gases passing through an exhaust pipe downstream of the one or more engine cylinders, into electrical signals representative of the light signals;
measuring amplitudes of the electrical signals; and
classifying the electrical signals into misfires and firings according to amplitudes.

35. The method of claim 34, further comprising:
counting and recording the misfires and firings; and
identifying a cylinder of the engine from which each misfire and firing comes.

36. The method of claim 35, wherein the detecting light signals is through a window situated on the exhaust pipe.

37. A misfire monitor of an engine having at least one engine cylinder, comprising:
means for detecting light emerging from an exhaust gas in an exhaust pipe downstream of the at least one engine cylinder;
means, connected to said means for detecting light, for providing electrical signals representative of the light;
means for classifying the electrical signals into misfires and firings; and
means for counting and recording the misfires and firings.

38. The misfire monitor of claim 37, further comprising means for identifying a cylinder of the engine, which a misfire or firing is from.

39. The misfire monitor of claim 38, wherein said means for detecting light comprises:
a window formed on the exhaust pipe; and
a light detector situated proximate to the window for detecting the light.

40. The misfire monitor of claim 39, wherein the light is infrared light.

41. The misfire monitor of claim 40, wherein the infrared light is a thermal emission of $CO_2$.

42. The misfire monitor of claim 40, wherein the infrared light is a thermal emission of $H_2O$.

43. The misfire monitor of claim 39, further comprising a means for detecting signals of an exhaust gas in an exhaust port of each cylinder, in lieu of said means for detecting light signals emerging from an exhaust gas in the exhaust pipe.

44. The misfire monitor of claim 39, wherein the light is a thermal emission.

45. The misfire monitor of claim 41, further comprising a cooling device proximate to said light detector to minimize background thermal emission from an exhaust pipe area viewed by said light detector.

46. The misfire monitor of claim 45, wherein minimizing the background thermal emission increases a signal-to-noise ratio of the electrical signals.

47. A misfire monitor for an engine having at least one engine cylinder, comprising:
a detector for sensing light signals emitted from an exhaust gas from the engine downstream of the at least one engine cylinder; and
a processor, connected to said detector, for processing electrical signals from said detector and for identifying a misfire of the engine therefrom.

48. The misfire monitor of claim 47, wherein said detector receives light through a proximate window situated on an exhaust pipe of the engine.

49. The misfire monitor of claim 48, wherein:
the electrical signals from said detector are representative of the light signals; and
said processor classifies each of the electrical signals from said detector as a misfire or a firing.

* * * * *